(12) United States Patent
Sanchez Belmar

(10) Patent No.: US 6,436,242 B1
(45) Date of Patent: Aug. 20, 2002

(54) DEVICE AND METHOD FOR DISTILLING WATER

(75) Inventor: Pedro Joaquin Sanchez Belmar, Calle Don Luis No. 4, Cabezo de Torres, 80110 Murcia (ES)

(73) Assignee: Pedro Joaquin Sanchez Belmar, Murcia (ES)

( * ) Notice: Subject to any disclaimer, the term of this patent is extended or adjusted under 35 U.S.C. 154(b) by 0 days.

(21) Appl. No.: 09/502,104

(22) Filed: Feb. 10, 2000

(51) Int. Cl.[7] .............................. B01D 1/28; B01D 3/10; B01D 3/42; C02F 1/04
(52) U.S. Cl. ...................... 202/182; 202/172; 202/205; 159/24.1; 159/44; 159/DIG. 16; 203/1; 203/11; 203/26; 203/DIG. 17; 203/DIG. 25
(58) Field of Search ................ 202/205, 182, 202/200, 160, 172; 203/10, 11, 24–26, 1, 23, DIG. 17, DIG. 18, DIG. 25; 159/24.1, 44, DIG. 16; 210/265, 512.1, 513

(56) References Cited

U.S. PATENT DOCUMENTS

| | | | | |
|---|---|---|---|---|
| 849,579 A | * | 4/1907 | Siebel .......................... | 203/26 |
| 1,461,640 A | * | 7/1923 | Wirth-Frey ................. | 159/24.1 |
| 2,895,546 A | * | 7/1959 | Sadtler ........................ | 159/24 |
| 3,294,649 A | * | 12/1966 | Powell, Jr. .................. | 203/10 |
| 3,725,205 A | | 4/1973 | Heen ........................... | 202/181 |
| 3,856,632 A | * | 12/1974 | Peter ........................... | 203/11 |
| 3,956,072 A | * | 5/1976 | Huse ........................... | 203/26 |
| 5,906,714 A | * | 5/1999 | Gramkow et al. ............ | 203/2 |

FOREIGN PATENT DOCUMENTS

| | | |
|---|---|---|
| DE | 4318936 | 9/1994 |
| FR | 2531418 | 2/1984 |

OTHER PUBLICATIONS

Alfa Laval Product Description "Desalt VVC 800/1200 Series Vacuum Vapor Compression Distiller".

* cited by examiner

Primary Examiner—Virginia Manoharan
(74) Attorney, Agent, or Firm—Davidson, Davidson & Kappel, LLC

(57) ABSTRACT

A water distiller has a sub-atmospheric boiler having a non-recirculating brine section, an input, a brine output and a vapor output. The input is for water to be distilled, the brine output for brine, and the vapor output for water vapor. A compressor is connected to the vapor output for heating the water vapor, and an heated vapor line is connected to an output of the compressor, the heated vapor line heating the brine section.

11 Claims, 2 Drawing Sheets

DEVICE AND METHOD FOR DISTILLING WATER

BACKGROUND OF THE INVENTION

1. Field of the Invention

The present invention relates to a method and device for distilling water, for example to desalinate or remove contaminants from water.

2. Background Information

Distillation of seawater or contaminated water occurs through boiling water to produce water vapor. The vapor, which largely is free of salt and other contaminants, is then extracted to provide pure distilled water.

In prior art desalinating devices, it has been known to boil seawater at sub-atmospheric pressures, so that the boiling point of the seawater is lowered. For example, pure water will boil at 1 atmosphere (760 mm Hg) at about 100 degrees Celsius. At a pressure of 0.5 atmospheres, pure water will boil at about 81 degrees Celsius. Salt content however raises the boiling point of water due to boiling point elevation, also known as molecular elevation of the boiling point. For example, one extra gram of salt in a liter of water at atmospheric pressure will raise the boiling point approximately 0.5 degrees Celsius. The boiling point elevation effect is reduced at lower pressures however, so that an extra gram of salt will raise the boiling point temperature by less that the amount at atmospheric pressure. As a result, the boiling point of salt water or brine can be adjusted by controlling the pressure, temperature and salinity of the salt water to be boiled.

Once water has been boiled to form vapor or steam, it is possible to raise the temperature of the steam by compressing the steam, since steam generally follows the perfect or ideal gas law, i.e. $PV=RT$, where P is pressure, V is volume, R is a constant and T is temperature.

The firm Alfa Laval sells a vacuum vapor compression distiller which functions as follows.

Seawater is fed through a the Alfa Laval distiller so that a distillate stream and a brine stream are output, the brine stream having approximately twice the salinity of the seawater and the distillate stream containing substantially pure water. The seawater first is fed through a filter, is split into two input substreams, one of the substreams being preheated in a heat exchanger by the brine output stream and one by the distillate output stream. The input substreams are then recombined, and the seawater is vented to remove air and NC gases. The seawater then passes into an evaporation chamber of an evaporation condenser, which is a large horizontal cylindrical structure. A vacuum has lowered the atmospheric pressure of the evaporation chamber to a sub-atmospheric pressure. By virtue of the temperature and the pressure in the evaporation chamber, a recirculating brine stream (taken from the seawater and the remains of evaporated brine) evaporates, i.e. boils. The evaporated water vapor then is sent through a vapor compressor, which raises its temperature. The water vapor is then sent back through heat exchanger plates, which reheats recirculating brine and at the same time condenses to form the distillate, i.e. pure water. The reheated brine evaporates due to its increased temperature, thereby forming more water vapor to be sent through the compressor. The brine which is not re-circulated is output from the evaporator condensor by a discharge pump.

The Alfa Laval distiller thus produces a continuous process which outputs a distillate stream and a brine stream having approximately twice the salinity of the incoming seawater.

However, the Alfa Laval distiller has several disadvantages: (1) the brine in the evaporator distiller is split into two substreams: one which is output and one which recirculates to be reheated and evaporated in a plate-type system. This brine has a high salt and/or contaminant content which can foul the piping or plate-type system. Thus an anti-scalant dosing unit is provided to the recirculating brine stream, which can be expensive and complicated. Moreover, even with anti-scalant the plate-type system may fail; (2) an extra filter and an electrical heater also added to the recirculating brine stream. These elements are expensive and also prone to expensive maintenance; (3) the vapor and brine streams must be split into several substreams to be fed through the plate-type system, which thus becomes complicated, expensive and more prone to failure; and (4) the brine output stream has approximately twice the salinity of the seawater, which is too low a concentration for further processing and generally must be considered waste brine. The waste brine stream must generally be returned to a large body of seawater, so as not to environmentally disturb the body of water by increasing its salinity greatly, or be processed in costly and expensive ways such as being deposited in a deep well. Moreover, the distiller cannot be used for decontamination of water with pollutants, as the remaining contaminants are still in a dissolved form.

SUMMARY OF THE INVENTION

An object of the present invention is to provide a low maintenance device and method for distilling water. An additional or alternative method of the present invention is to provide a device and method for distilling water which can produce a high concentration brine or contaminated water stream to permit extraction of salt or contaminants. Another additional or alternative object of the present invention is to provide a low cost device and method for distilling water.

The present invention provides a water distiller comprising a sub-atmospheric boiler having a non-recirculating brine section, an input, a brine output and a vapor output, the input for water to be distilled, the brine output for brine, and the vapor output for water vapor. A compressor or other vapor heater is connected to the vapor output and heats the water vapor. An heated vapor line then heats the brine section of the boiler, the heated vapor line eventually outputting the water vapor in condensed form as distillate.

Because the brine section does not need to re-circulate through a heat exchanger, the distiller of the present invention can provide for much more concentrated brines, which can be output through the brine output. "Brine" as defined herein is water having a high salt or contaminant concentration. The concentrated brines provided by the present device can be easily centrifuged to provide salable salt or to provide solid and easily disposable contaminants.

Moreover, with the present device no anti-scalant need be used and a plate-type system is not necessary.

For example, some seawater contains approximately 30 grams of salt per liter. The present device can produce an output brine with a concentration of salt of over 200 grams per liter, or more preferably of a concentration of 250 to 350 grams per liter. At this concentration, the brine can be centrifuged to provide salt which can be resold. The distiller of the present invention thus preferably further includes a centrifuge connected to the brine output for producing solid salt or waste. The water removed from the centrifuge preferably is returned through the input to the boiler, so that a closed system results, the only outputs being the salt or waste and the distilled water.

The brine section preferably is at the bottom of the boiler. The boiler preferably includes a filter, most preferably made of titanium wool, over brine section. The filter permits vapor to escape but helps retain contaminants and/or salt in the brine. In order to provide for continuous cleaning of the filter, the input may be located above the filter, so that the input water flows over the filter. A second filter may also be provided above the first filter for additional filtering, and may be cleaned periodically.

The heated vapor line may wrap around the outside of the brine section or may pass through the brine section, preferably in coiled form. After condensation, the heated vapor line forms a heated distillate line. Preferably, the heated distillate line passes though a heat exchanger to heat water entering in through the input line to the input of the boiler.

The input line preferably includes an initial silica filter and a venting device, and the heated vapor line preferably ends with a pressure valve, which permits condensed water to pass to the heated distillate line.

The boiler preferably is made of stainless steel and includes a thermal insulator, for example ceramic or an air chamber around the outer surface of an interior vacuum chamber. A vacuum device can be used to initially provide the sub-atmospheric pressure, and to adjust the pressure when necessary. The vacuum device may be connected to a controller.

The brine output line preferably is connected to a pump or valve, which is controlled by a controller. The controller is connected at an input to a salinity detector, and can activate the pump when a predetermined salinity is reached in the brine section of the boiler. The pump or valve can pump or release brine from the brine section to the brine output line. The controller may be for example a personal computer with a Pentium-processor from the Intel Corporation, and can activate the pump, when for example a salinity of 300 grams per liter is reached in the brine.

In a preferred embodiment, the input water is seawater. However, the present invention may also be used with the input water being salt water having a concentration of salt greater than 50 grams per liter. The present invention thus advantageously can be used to process the brine expelled as waste water from other types of desalination devices. The present device thus may further include that the input is connected to an output of a brine-type desalination device. The input water also may be polluted water.

In a preferred embodiment, the water to be input is seawater and the seawater enters a silica filter at approximately 23 degrees Celsius, is heated in a heat exchanger to approximately 40 degrees Celsius, is vented and enters the sub-atmospheric boiler, where part of the seawater evaporates instantaneously and a liquid part enters a brine section after passing through and helping clean a titanium wool filter. The evaporated seawater and brine which is evaporating or boiling continuously produces a vapor at about 40 degrees Celsius which passes through a second filter and is compressed. The vapor temperature rises to a temperature of about 120 degrees Celsius. The heated vapor line with the 120 degree Celsius vapor then reheats the brine section by passing through the brine section in coiled form, thus aiding the brine evaporation or boiling. The heated vapor after losing some of its heat to the brine section and condensing passes through a pressure valve where the resulting condensed distillate is about 60 to 80 degrees Celsius and passes through the heat exchanger and exits at approximately 30 degrees Celsius as pure water. The brine is removed periodically when its salinity content reaches between 250 and 350 grams/liter, and is centrifuged to less than three percent humidity. The pressure in the boiler is set to provide boiling of the brine at 40 degrees Celsius, and is set as a function of the salinity.

The present invention also provides a water distiller comprising a sub-atmospheric boiler having a brine section having a salinity greater than 200 grams/liter, an input, a brine output and a vapor output, the input for water to be distilled, the brine output for brine, and the vapor output for water vapor. A compressor or other vapor heater is connected to the vapor output and heats the water vapor. An heated vapor line then heats the brine section of the boiler, the heated vapor line eventually outputting the water vapor in condensed form as distillate.

The high salinity of the brine section, while requiring a lower pressure for boiling of the water, permits for a high salinity brine which can then be centrifuged.

Preferably the salinity of the brine section is between 250–350 grams per liter.

The present invention also provides a method for distilling water comprising the steps of:

entering water to be distilled into a sub-atmospheric boiler, a part of the water to be distilled boiling and a part entering a brine section of the boiler;

raising a temperature of water vapor exiting the boiler so as to form a heated water vapor;

passing the heated water vapor by the brine section so as to heat the brine section; and removing brine from the brine section when the brine exceeds a predefined salinity.

With the present method, the brine is not continuously re-circulated, but is rather removed upon reaching a predetermined salinity. This method permits a more concentrated brine to be formed, which can be highly advantageous.

Preferably the predefined salinity is greater than 150 grams per liter, at which point centrifuging may become practical. Most preferably the salinity is great than 200 grams per liter, and even more preferably between 250 and 350 grams per liter, at which point centrifuging is practical.

BRIEF DESCRIPTION OF THE DRAWINGS

The present invention may be better understood with reference to a preferred embodiment in which.

DETAILED DESCRIPTION

Figure 1:
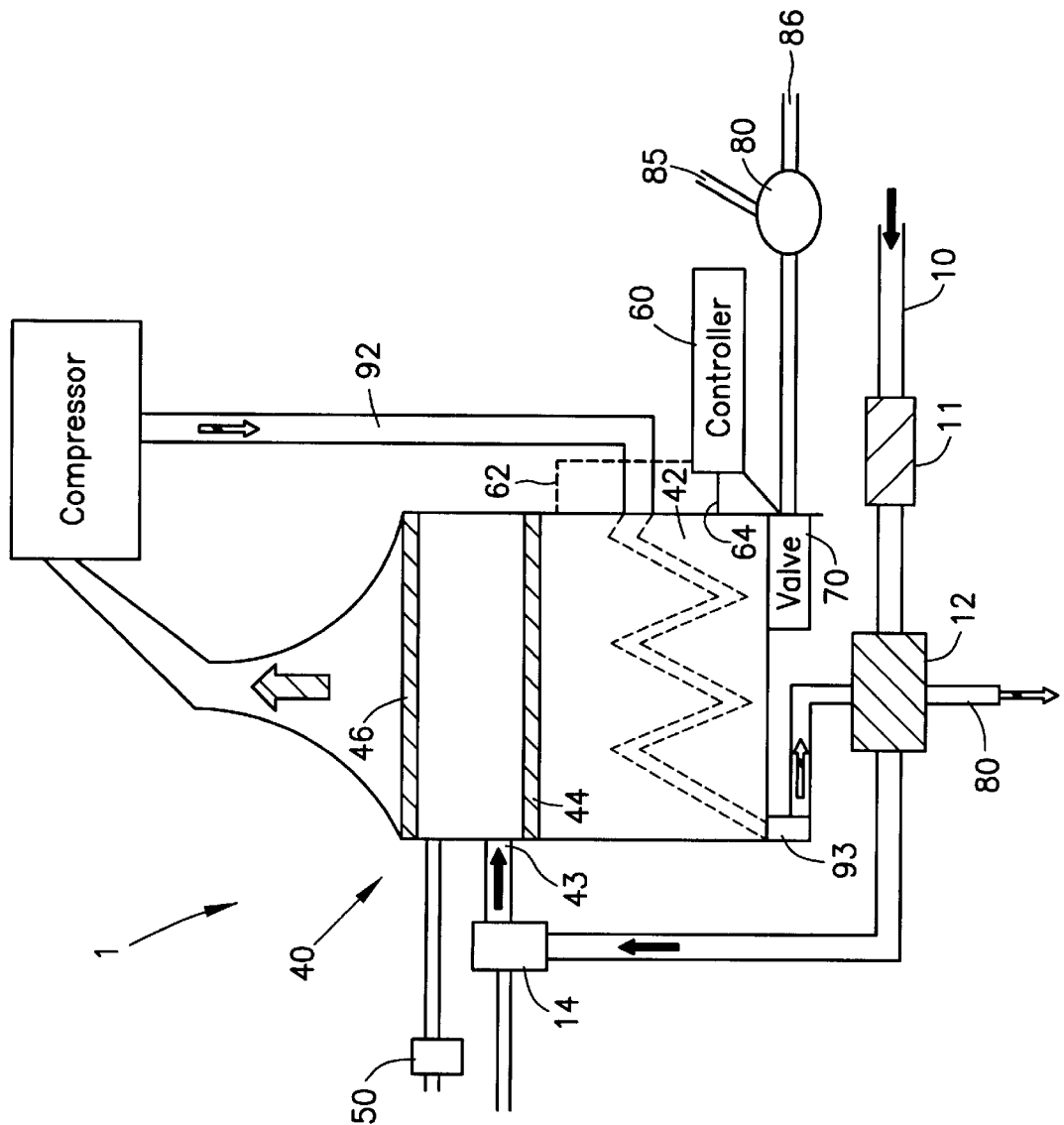
FIG. 1 shows an overview of the distiller of the present invention.

FIG. 1 shows a schematic view of the distiller 1 of the present invention for use with desalinating or decontaminating seawater or exit brines from other desalinators, for example an exit brine with a salinity of about 60 grams per liter. The water to be distilled is pumped or fed to an input line 10, is boiled in a sub-atmospheric boiler 40 to produce water vapor, which condenses and exits as pure water through a distillate output line 80. The flow of water to be distilled is shown generally by solid arrows, and the flow of pure water or water vapor is shown generally by striped arrows. Water to be distilled in input line 10 passes first through a silica filter 11 to remove larger impurities. Input line 10 then passes through a heat exchanger 12 with distillate output line 80. Heat exchanger 12 may be for example a structure where the distillate output line 80 is coiled within or about an enlarged section of input line 10, or may be any other type of heat exchanger, such as plate-based heat exchanger. The input line 10 has a venting device 14 for removing air and NC gases from the water to be distilled.

The water to be distilled then flows or is pumped into boiler 40, which is at a low atmospheric pressure. Boiler 40 may be made for example of stainless steel and may be insulated by a ceramic or other known heat insulator. The low pressure can be provided by a vacuum pump 50, which can be connected to a controller 60, which also may have a boiler pressure monitoring line 62. Boiler 40 has at the bottom a brine section 42 where brine collects. A salinity monitoring line 64 is connected to the brine section and provides an input to controller 60, which may be for an Intel PENTIUM processor based computer.

Controller 60 controls vacuum pump 50 and a brine discharge valve or pump 70, which permits the brine in brine section 42 to flow to a centrifuge 80, which can split the brine into salt through centrifuge exit 85 (shown schematically) and water through line 86. Line 86 can be returned to input line 10 if the water in line 86 is not fully desalinated.

The water to be distilled enters boiler 40 at an input 43 above a titanium wool filter 44. Part of the water evaporates immediately through a second filter 46, and is fed at the low pressure of the boiler to a compressor 90, which compresses the steam so as to heat the steam vapor. The heated vapor exits the compressor through a heated vapor line 92, which passes through or about brine section 42 in coiled form, thus reheating the brine in brine section 42. The brine in brine section 42 thus boils, and water vapor passes through filters 44 and 46 to the compressor 90.

The water to be distilled which is not evaporated when entering the boiler 40 at input 43 passes through the filter 44 to the brine section 42, and in the process continuously cleans the titanium wool filter by forcing particles caught in the filter to fall back into the brine section 42. Filter 46 can be cleaned periodically.

The water vapor in heated vapor line 92, after transferring heat to brine section 42 passes through a pressure valve 93, by which time the vapor has condensed and passes as generally pure water at a fairly high temperature in distillate output line 80 through heat exchanger 12, where the temperature of the distillate is lowered by providing heat to input line 10.

Figure 2:
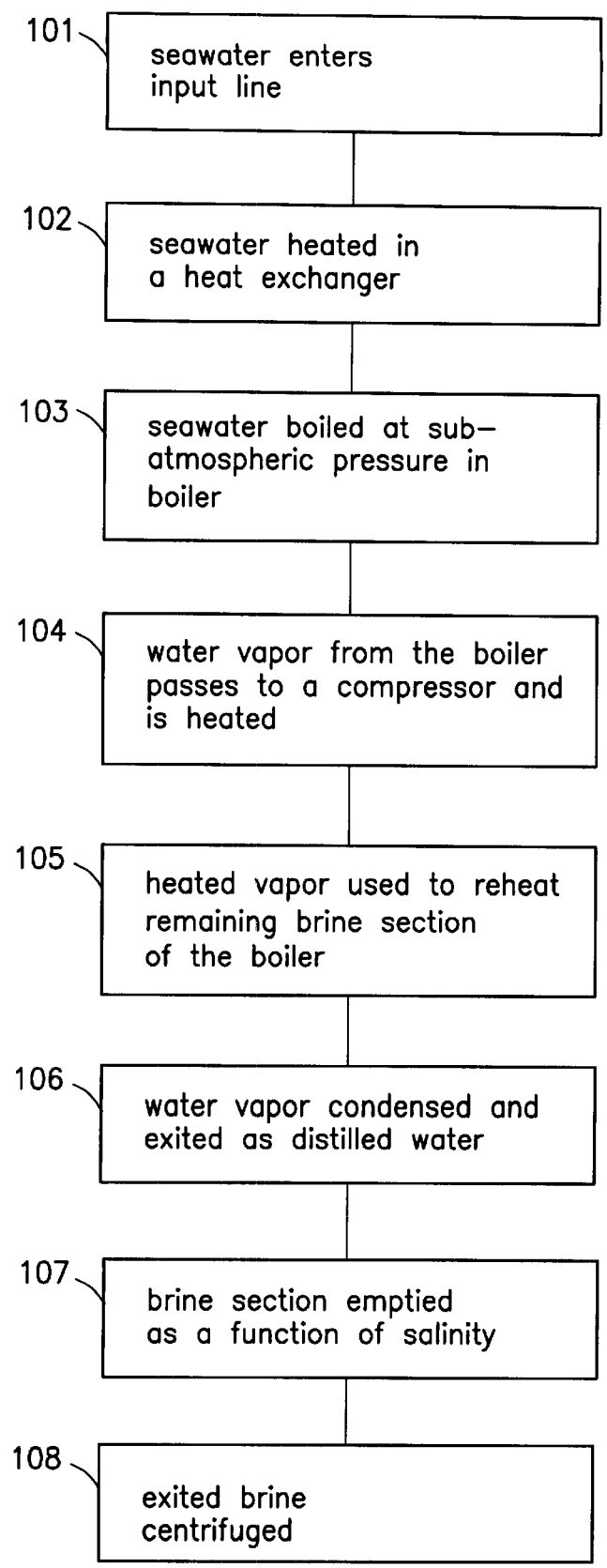
FIG. 2 is a flowchart of a method according to the present invention.

FIG. 2 shows a flowchart of the method of the present invention for use with seawater in the device of FIG. 1. It should be understood however that the present invention may be used to process brines with higher salinity than seawater. In step 101, seawater enters an input line 10 and may be filtered in filter 11. For example, the seawater is at 23 degrees Celsius. In step 102, the seawater is heated in a heat exchanger 12 heated by a distillate output line 80. The seawater may exit the heat exchanger at 40 degrees Celsius, for example. The seawater is then de-aerated and partially boiled at sub-atmospheric pressure in boiler 40, in step 103. The actual pressure in the boiler will vary as a function of the temperature of the seawater and brine, and the salinity of the water. The temperature in the boiler may be 40 degrees Celsius for example, and the pressure below 55 mm Hg depending on the salinity. A vacuum pump 50 may set the pressure in the boiler as a function of the temperature and salinity. Any remaining seawater which does not boil passes to a brine section 42 of the boiler. In step 104, the water vapor from the boiler passes to a compressor 90, for example at 40 degrees Celsius. In compressor 90 the vapor is compressed so as to exit into a heated vapor line 92 at a temperature, for example of 120 degrees Celsius. In step 105, the heated vapor line 92 reheats the brine section of the boiler to 40 degrees Celsius. In step 106, the water vapor condenses and is exited as distilled water. In step 107, the brine section is emptied as a function of salinity, for example when a salinity level of at least 200 grams per liter is reached, preferably between 250 and 350 grams per liter. The exited brine is then centrifuged in step 108 to provide salt and water.

The brine section 42 is thus constantly boiling due to the heat provided by a heat exchange with the compressed vapor line 92. While the energy required by the present invention may be higher than in prior art devices, the present invention provides advantages in dispensing with complicated plate-type systems, brine re-circulation units and anti-scalant units, as well as providing for the production of highly concentrated exit brines which can be centrifuged.

In a highly advantageous embodiment, the water to be distilled is waste brine from a desalinating device. Present desalinating devices often require complicated and expensive mechanisms for disposing of their waste brines, which cannot be centrifuged in a practical manner because the salinity is too low. The present invention permits exit brines of a much higher salinity, for example 250 grams per liter, and thus can be used to desalinate brines with a salinity of up to 150 grams per liter. Most preferably, the salinity of the exit brine of desalination device attached to the device of the present invention is between 40 and 80 grams per liter.

Liquids other than water may also be decontaminated or desalinated within the scope of the present invention. Also the present invention may have particular application to decontaminating water with pollutants such as oil or heavy metals.

What is claimed is:
1. A water distiller comprising:
 a sub-atmospheric boiler having a non-recirculating brine section, an input, a brine output and a vapor output, the input for water to be distilled, the brine output for brine, and the vapor output for water vapor;
 a compressor connected to the vapor output for heating the water vapor; and
 an heated vapor line connected to an output of the compressor, the heated vapor line heating the brine section; and
 a centrifuge connected to the brine output.
2. The water distiller as recited in claim 1 wherein the heated vapor line passes through the brine section.
3. The water distiller as recited in claim 1 wherein the heated vapor line forms a heated distillate line which heats an input line connected to the input.
4. The water distiller as recited in claim 3 wherein the heated vapor line includes a pressure valve, after which the heated distillate line begins.
5. The water distiller as recited in claim 1 further comprising the brine, wherein the brine section includes the brine, the brine having a salinity of greater than 200 grams per liter.
6. The water distiller as recited in claim 5 wherein the brine has a salinity of between 250 and 350 grams per liter.
7. The water distiller as recited in claim 1 further comprising a controller having an input for monitoring a salinity of the brine section.
8. The water distiller as recited in claim 1 further comprising a separate desalinator, the separate desalinator having a waste brine output connected to the input for water to be distilled.

9. A water distiller comprising:

brine;

a sub-atmospheric boiler having a brine section containing the brine, the brine having a salinity greater than 150 grams/liter, an input, a brine output and a vapor output, the input for water to be distilled, the brine output for the brine, and the vapor output for water vapor;

a compressor connected to the vapor output for heating the water vapor; and an heated vapor line connected to an output of the compressor, the heated vapor line heating the brine section of the boiler; and a centrifuge connected to the brine output.

10. The water distiller as recited in claim 9 wherein the salinity of the brine is between 250–350 grams per liter.

11. A water distiller comprising:

a sub-atmospheric boiler having a brine section having brine with brine section salt and brine section water, an input, a brine output and a vapor output, the input for water to be distilled, the brine output for the brine, and the vapor output for water vapor;

a compressor connected to the vapor output for heating the water vapor;

an heated vapor line connected to an output of the compressor, the heated vapor line heating the brine section of the boiler;

a controller releasing the brine through the brine output when a concentration of the brine section salt reaches at least 150 grams per liter of the brine section water; and a centrifuge connected to the brine output.

* * * * *